United States Patent
Chiueh et al.

(10) Patent No.: US 9,164,887 B2
(45) Date of Patent: Oct. 20, 2015

(54) POWER-FAILURE RECOVERY DEVICE AND METHOD FOR FLASH MEMORY

(75) Inventors: Tzi-Cker Chiueh, Taipei (TW); Ting-Fang Chien, Taoyuan County (TW); Shih-Chiang Tsao, Hsinchu (TW); Chien-Yung Lee, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 968 days.

(21) Appl. No.: 13/310,806

(22) Filed: Dec. 5, 2011

(65) Prior Publication Data
US 2013/0145076 A1    Jun. 6, 2013

(51) Int. Cl.
G06F 13/00 (2006.01)
G06F 12/02 (2006.01)
G06F 11/14 (2006.01)
G06F 12/08 (2006.01)

(52) U.S. Cl.
CPC ........ G06F 12/0246 (2013.01); G06F 11/1417 (2013.01); G06F 12/0875 (2013.01); G06F 2212/7201 (2013.01)

(58) Field of Classification Search
None
See application file for complete search history.

(56) References Cited

U.S. PATENT DOCUMENTS

| | | |
|---|---|---|
| 6,021,408 A | 2/2000 | Ledain et al. |
| 7,844,772 B2 | 11/2010 | Moon et al. |
| 7,941,692 B2 | 5/2011 | Royer et al. |
| 7,979,626 B2 | 7/2011 | Rogers et al. |
| 2008/0104308 A1 | 5/2008 | Mo et al. |
| 2008/0189490 A1 | 8/2008 | Cheon et al. |
| 2009/0070547 A1 | 3/2009 | Jeong et al. |
| 2009/0172257 A1* | 7/2009 | Prins et al. ............ 711/103 |
| 2009/0172319 A1 | 7/2009 | Gokhale et al. |
| 2009/0172466 A1 | 7/2009 | Royer et al. |
| 2009/0287874 A1 | 11/2009 | Rogers et al. |

(Continued)

FOREIGN PATENT DOCUMENTS

| | | |
|---|---|---|
| CN | 1447243 | 10/2003 |
| CN | 101241474 | 8/2008 |
| CN | 101825944 | 9/2010 |

OTHER PUBLICATIONS

Mei-Ling Chiang, et al., "Using Data Clustering to Improve Cleaning Performance for Flash Memory", Journal of Systems and Software (1999), p. 1-40.

(Continued)

Primary Examiner — Sean D Rossiter
(74) Attorney, Agent, or Firm — Jianq Chyun IP Office (57) ABSTRACT

A memory storage system includes multiple flash memory storage devices, multiple transmission interfaces and a central control device. The central control device has a cache and respectively coupled to the flash memory storage devices through the transmission interfaces. The central control device is for maintaining a block map table (BMT) to record a mapping relationship between multiple logical blocks and the physical blocks of the flash memory storage devices and the BMT is temporarily stored in the cache. In addition, the central control device uses the communication commands to access the physical blocks of the flash memory storage devices, in which the communication commands are transmitted to multiple controllers in the flash memory storage devices through the transmission interfaces and the controllers access the physical blocks according to communication commands. In this way, the system can effectively manage multiple flash memory storage devices.

16 Claims, 7 Drawing Sheets

(56) References Cited

U.S. PATENT DOCUMENTS

| | | | |
|---|---|---|---|
| 2010/0095148 A1 | 4/2010 | Cheng | |
| 2010/0235565 A1* | 9/2010 | Ton-That et al. | 711/103 |
| 2010/0306451 A1* | 12/2010 | Johnson | 711/103 |
| 2011/0320733 A1* | 12/2011 | Sanford et al. | 711/135 |
| 2012/0239869 A1* | 9/2012 | Chiueh et al. | 711/103 |
| 2014/0173268 A1* | 6/2014 | Hashimoto | 713/2 |

OTHER PUBLICATIONS

Youngjae Kim, et al., "Harmonia: A Globally Coordinated Garbage Collector for Arrays of Solid-state Drives", Proceedings of the IEEE Symposium on Massive Storage Systems and Technologies (MSST), Denver, Colorado, May 2011, p. 1-12.

Tae-Sun Chung, et al., "PORCE: An efficient power off recovery scheme for flash memory", Journal of Systems Architecture, 2008, p. 935-943.

Jen-Wei Hsieh, et al., "Efficient Identification of Hot Data for Flash Memory Storage Systems", ACM Transactions on Storage, vol. 2, No. 1, Feb. 2006, pp. 22-40.

"Office Action of China Counterpart Application", issued on Feb. 25, 2015, p. 1-p. 9, in which the listed references were cited.

* cited by examiner

| address of logic block | address of physical block |
|---|---|
| 410(1) | 210(1) |
| 410(2) | 210(2) |
| 410(3) | 210(N+3) |
| 410(4) | 210(2N) |
| ⋮ | ⋮ |
| 410(H) | 210(2N+8) |

POWER-FAILURE RECOVERY DEVICE AND METHOD FOR FLASH MEMORY

BACKGROUND OF THE INVENTION

1. Field of the Invention

The disclosure relates to a memory storage system and a central control device, a management method and a power-failure recovery method.

2. Description of the Related Art

The flash memory is a non-volatile storage device. The data stored in a flash memory would not disappear during power-off and the flash memory is able to provide fast reading efficiency. In more details, although the access speed of a flash memory is not so fast as a dynamic random-access memory (DRAM), but it is low noise, small volume and fast access. In electronic communication products, the flash memory thereby has been broadly applied in commodity such as camera, mobile phone, flash drive and notebook computer.

A flash memory has unique characteristic. For example, data can not be directly repeatedly written into the same physical address; instead, the data only can be rewritten after performing an erasing operation. In addition, a flash memory has a plurality of physical blocks and each physical block has a plurality of physical pages, in which the minimum erasing unit is one physical block (also termed as erase unit (EU)) and the minimum writing unit is a page. Each physical page includes a data-area and a spare-area, in which the data-area is used for storing general data and the spare-area is used for storing metadata corresponding to the general data. The metadata includes, for example, logic address which the general data belong to and error correction code corresponding to the general data. Moreover, each physical block has an upper limit of erasing number of times, for example, 10-100 thousands. When the erasing number of times of a physical block reaches the upper limit, the physical block may be damaged and unable to write date into. Further, to write data into each physical block, the data must be written following the sequence of the physical pages.

Due to the above-mentioned access limit of a flash memory, in general speaking, a flash memory storage system would employ a flash translation layer (FTL) therein to conduct a translation management between logic positions and physical positions, where a mapping relationship between logic positions and physical positions is stored through maintaining a block map table (BMT).

Based on the above mentioned description, in a large server, if the system employs flash memories serving as storage units, many problems must be confronted. For example, a plurality of flash memory storage devices must be managed simultaneously, so that the translation management between logical positions and physical positions becomes more complex. Since during the operation of the flash memory storage system, the BMT must be temporally stored in a volatile memory for updating convenience, hence, once abnormal shutdown occurs, the BMT would be lost. When that is the case, although the BMT can be rebuilt by scanning the spare-areas of the physical pages of all the physical blocks in all the flash memory storage devices during rebooting, but it definitely consumes much time. In this regard, how to effectively manage a large memory storage system with multiple flash memory storage devices and deal with and respond abnormal shutdown of the large memory storage system has become a critical issue to be solved by the relevant developers.

SUMMARY OF THE INVENTION

Accordingly, the disclosure is directed to a memory storage system and a management method, a power-failure recovery method and a central control device thereof, which are able to effectively manage a plurality of flash memory storage devices.

In addition, the disclosure is directed to a memory storage system and a management method, a power-failure recovery method and a central control device thereof, which are able to deal with abnormal shutdown and make the system recovered.

The disclosure provides a memory storage system including a plurality of flash memory storage devices, in which each of the flash memory storage devices has a controller and a flash memory module, each of the flash memory modules has a plurality of physical blocks, each of the physical blocks has a plurality of physical pages and each of the physical pages has a data-area and a spare-area. The memory storage system further includes a plurality of transmission interfaces and a central control device wherein the central control has a cache and couples to the flash memory storage devices respectively through the above-mentioned transmission interfaces. The central control device is configured for maintaining a block map table (BMT), and transmitting a plurality of communication commands through the transmission interfaces to the controllers to access the physical blocks of the flash memory storage devices. The BMT records a mapping relationship between a plurality of logical blocks and the physical blocks, and the BMT is temporarily stored in the cache. The central control device of the memory storage system accesses the physical blocks of the flash memory storage devices according to the BMT by using a plurality of communication commands, in which the central control device transmits the communication commands to the controllers of the flash memory storage devices through the transmission interfaces and the controllers access the physical blocks according to the communication commands.

The disclosure further provides a management method for a memory storage system with a plurality of flash memory storage devices, in which each of the flash memory storage devices has a controller and a flash memory module, each of the flash memory modules has a plurality of physical blocks, each of the physical blocks has a plurality of physical pages and each of the physical pages has a data-area and a spare-area. The management method includes following steps: maintaining a block map table (BMT), in which the BMT records a mapping relationship between a plurality of logical blocks and the physical blocks, and the BMT is temporarily stored in the cache; using a plurality of communication commands to access the physical blocks of the flash memory storage devices according to the BMT, in which the communication commands are transmitted to the controllers through a plurality of transmission interfaces and the controllers access the physical blocks according to the communication commands.

The disclosure further provides a power-failure recovery method for a flash memory modules, in which the flash memory modules has a plurality of physical blocks, each of the physical blocks has a plurality of physical pages and each of the physical pages has a data-area and a spare-area. Te power-failure recovery method includes following steps: reading a super map from the physical blocks; reading a dedicated map according to the read super map; loading a block map table (BMT) stored in the physical blocks to a cache; judging whether or not abnormal shutdown occurs, in which when abnormal shutdown occurs, an update log is read according to the read dedicated map, a plurality of labels of the update log are sequentially distinguished into a plurality of update sections with a garbage collection label in the update log, the label of each of the update sections is read from the update log in a reverse way and the BMT temporarily stored in the cache is updated according to the read labels, in which the BMT records a mapping relation between a plurality of logical blocks and the physical blocks.

The disclosure further provides a central control device for managing a plurality of physical blocks of at least one flash memory module, in which each of the physical blocks has a plurality of physical pages and each of the physical pages has a data-area and a spare-area. The central control device includes a central processing unit (CPU); a cache coupled to the CPU; a data processing unit coupled to the CPU for accessing the physical blocks; and a mapping table maintaining unit coupled to the CPU. Herein, when rebooting, the mapping table maintaining unit reads a super map from the physical blocks, reads a dedicated map according to the read super map, loads a block map table (BMT) stored in the physical blocks to the cache according to the dedicated map and judges whether or not abnormal shutdown occurs. When abnormal shutdown occurs, the mapping table maintaining unit reads an update log according to the read dedicated map, sequentially distinguishes a plurality of labels of the update log into a plurality of update sections with a garbage collection label in the update log, reads the label of each of the update sections from the update log in a reverse way and updates the BMT temporarily stored in the cache according to the read labels, in which the BMT records a mapping relationship between a plurality of logical blocks and the physical blocks.

Based on the above-mentioned description, the memory storage system, the central control device and the management method in the exemplary embodiments of the disclosure are capable of largely improving the efficiency for controlling the flash memory storage devices through a plurality of communication commands in a batch-cycling writing way. In addition, the memory storage system, the central control device and the management method in the exemplary embodiments of the disclosure can effectively manage the mapping between logic addresses and physical addresses by using a super map, a dedicated map, a BMT and an update log designed in hierarchical way. Moreover, the memory storage system, the central control device and the power-failure recovery method in the exemplary embodiments of the disclosure can fast recover the BMT lost due to power-failure by using the information registered in the update log.

Several exemplary embodiments accompanied with figures are described in detail below to further describe the disclosure.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
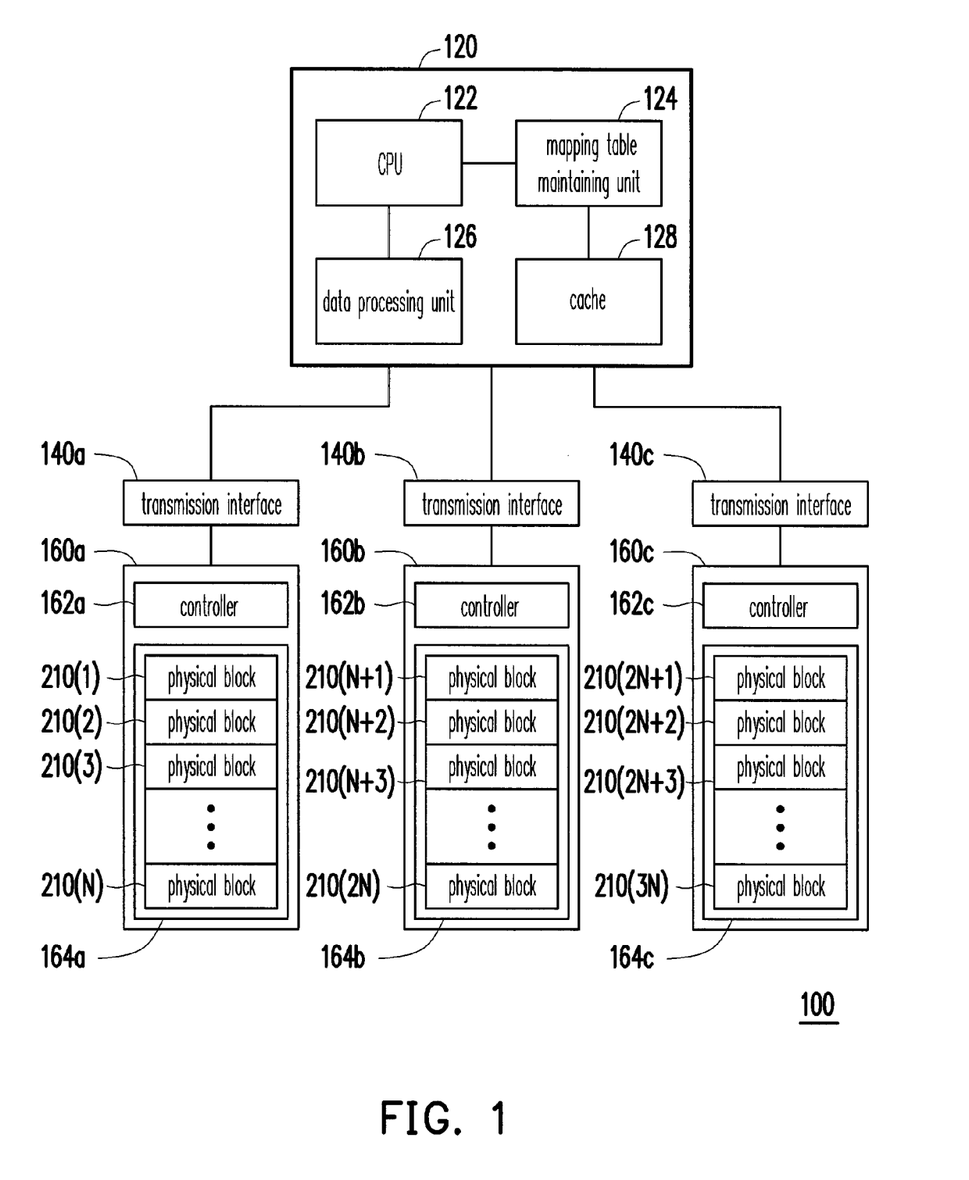
FIG. 1 is a block diagram of a memory storage system according to an exemplary embodiment of the disclosure.

FIG. 1 is a block diagram of a memory storage system according to an exemplary embodiment of the disclosure.

Referring to FIG. 1, a memory storage system 100 includes a central control device 120, a plurality of transmission interfaces (i.e., a first transmission interface 140a, a second transmission interface 140b and a third transmission interface 140c) and a plurality of flash memory storage devices (i.e., a first flash memory storage device 160a, a second flash memory storage device 160b and a third flash memory storage device 160c).

The central control device 120 is respectively coupled to the first flash memory storage device 160a, the second flash memory storage device 160b and the third flash memory storage device 160c through the first transmission interface 140a, the second transmission interface 140b and the third transmission interface 140c for controlling and managing the first flash memory storage device 160a, the second flash memory storage device 160b and the third flash memory storage device 160c. In the exemplary embodiment, the central control device 120 is a PC, however, the central control device 120 can be also a server, an audio player, a video player or other electronic apparatuses, which the disclosure is not limited to.

The central control device 120 includes a central processing unit (CPU) 122, a mapping table maintaining unit 124, a data processing unit 126 and a cache 128.

The CPU 122 is configured for controlling the overall operation of the central control device 120.

The mapping table maintaining unit 124 and the data processing unit 126 are coupled to the CPU 122 and configured for managing the first flash memory storage device 160a, the second flash memory storage device 160b and the third flash memory storage device 160c. The operations of the mapping table maintaining unit 124 and the data processing unit 126 are described in association with diagrams in following.

The cache 128 is configured for temporally storing data. For example, the cache 128 is a dynamic random-access memory (DRAM), which the disclosure is not limited to. In another exemplary embodiment, the cache 128 may be a static random access memory (SRAM).

In the exemplary embodiment, the first transmission interface 140a, the second transmission interface 140b and the third transmission interface 140c are compatible with SATA standard (serial advanced technology attachment standard). In another exemplary embodiment however, the first transmission interface 140a, the second transmission interface 140b and the second transmission interface 140b can be compatible with IEEE 1394 standard (Institute of Electrical and Electronic Engineers 1394) standard, PCI-E (peripheral component interconnect express) standard, USB (universal serial bus) standard, IDE (integrated device electronics) standard or other interface standards.

The first flash memory storage device 160a, the second flash memory storage device 160b and the third flash memory storage device 160c are solid state drive (SSD), which the disclosure is not limited to.

The first flash memory storage device 160a, the second flash memory storage device 160b and the third flash memory storage device 160c respectively have a controller (i.e., controllers 162a-162c) and a flash memory module (i.e., flash memory modules 164a-164c).

The controllers 162a-162c are configured for accessing data in the flash memory modules 164a-164c according to the command from the central control device 120.

The flash memory modules 164a-164c are respectively coupled to the controllers 162a-162c and have a plurality of physical blocks. In more details, the flash memory module 164a has physical blocks 210(1)-210(N), the flash memory module 164b has physical blocks 210(N+1)-210(2N) and the flash memory module 164c has physical blocks 210(2N+1)-210(3N).

Figure 2:
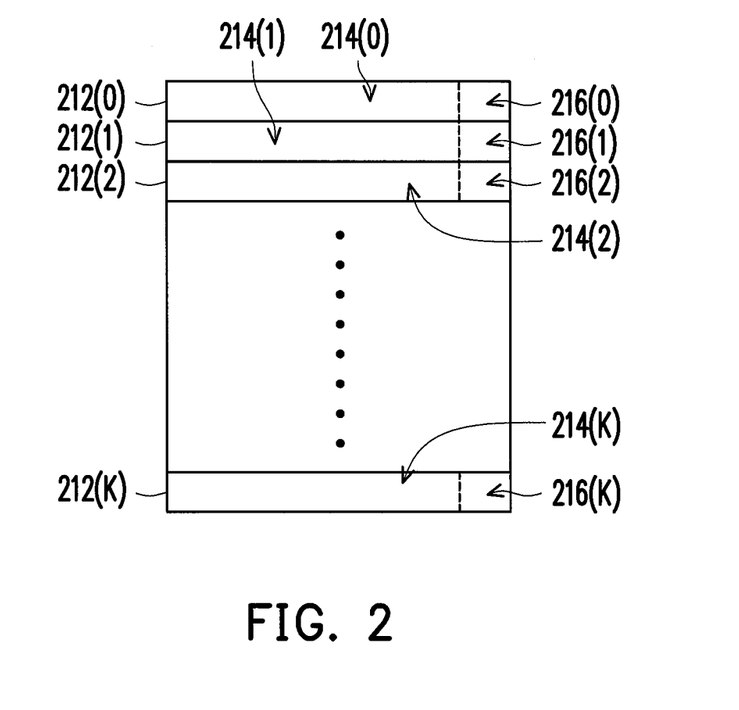
FIG. 2 is a schematic diagram of physical blocks according to an exemplary embodiment of the disclosure, in which the physical block 210(0), similar to other physical blocks, is chosen to be explained.

FIG. 2 is a schematic diagram of physical blocks according to an exemplary embodiment of the disclosure. Since each physical block has a similar structure to other physical blocks, only the physical block 210(1) herein is described.

Referring to FIG. 2, the physical block 210(1) includes (K+1) physical pages (i.e., physical pages 212(0)-212(K)), in which the physical pages 212(0)-212(K) are sequentially arranged, from the $0^{th}$ page to the $K^{th}$ page.

The physical pages belonging to the same physical block can be independently written in, however they must be altogether simultaneously erased. For example, each physical block is composed of 128 physical pages and the capacity of each physical page is 4K (4 kilobyte), which the disclosure is not limited to. In fact, each physical block may be composed of 64 physical pages, 256 physical pages or other numbers of physical pages, and the capacity of each physical page can be 2K, 8K or other values.

In more details, a physical block is the minimum erasing unit, i.e., each physical block contains multiple memory cells with a certain number and the number is the minimum one for erasing memory cells in one-time operation. A physical page is a minimum programming unit, i.e., each physical page is the minimum unit for writing data. Each physical page includes one data-area (for example, data-areas 214(0)-214(K)) and one spare-area (for example, spare-areas 216(0)-216(K)). The data-area of each physical page is for storing general data and the spare-area thereof is for storing a corresponding metadata. For example, when data belonging to a logical block are stored in the data-area 214(0) of the physical page 212(0), the spare-area 216(0) of the physical page 212(0) would store the address of the logical block, and the error-checking-and-correcting (ECC) code corresponding to the data, in which the data stored in the spare-area is termed as metadata.

It should be noted that in the memory storage system 100, the physical blocks are used to store data with an alternate way, so that the central control device 120 deploys a plurality of logical addresses (for example, logical blocks), which are provided to the operation system and the application programs for accessing. In particular, in the exemplary embodiment, the central control device 120 uses a plurality of communication commands to manage and control the first flash memory storage device 160a, the second flash memory storage device 160b and the third flash memory storage device 160c in a centralized manner. In following, some diagrams are used to describe in details the mechanism to manage and control in the centralized manner the first flash memory storage device 160a, the second flash memory storage device 160b and the third flash memory storage device 160c by using a plurality of communication commands.

Figure 3:
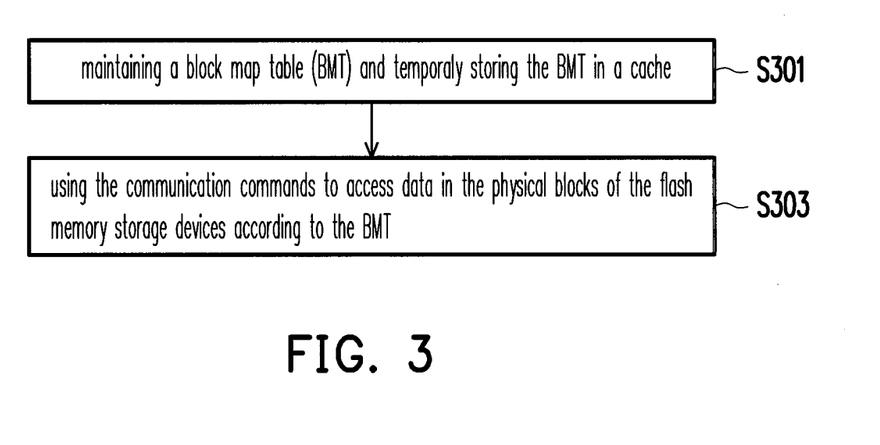
FIG. 3 is a flowchart of a management method according to an exemplary embodiment of the disclosure.

FIG. 3 is a flowchart of a management method according to an exemplary embodiment of the disclosure.

Referring to FIG. 3, in step S301, the central control device 120 maintains a BMT which is temporally stored in the cache 128.

In more details, in step S301, the mapping table maintaining unit 124 of the central control device 120 would maintain the BMT to record a mapping relation between the logical blocks and the physical blocks of the first flash memory storage device 160a, the second flash memory storage device 160b and the third flash memory storage device 160c. That is to say, in the exemplary embodiment, the BMT for recording the mapping relation between the physical blocks of all the flash memory storage devices and all the logical blocks is maintained and managed in the centralized manner by the central control device 120.

Figure 4:
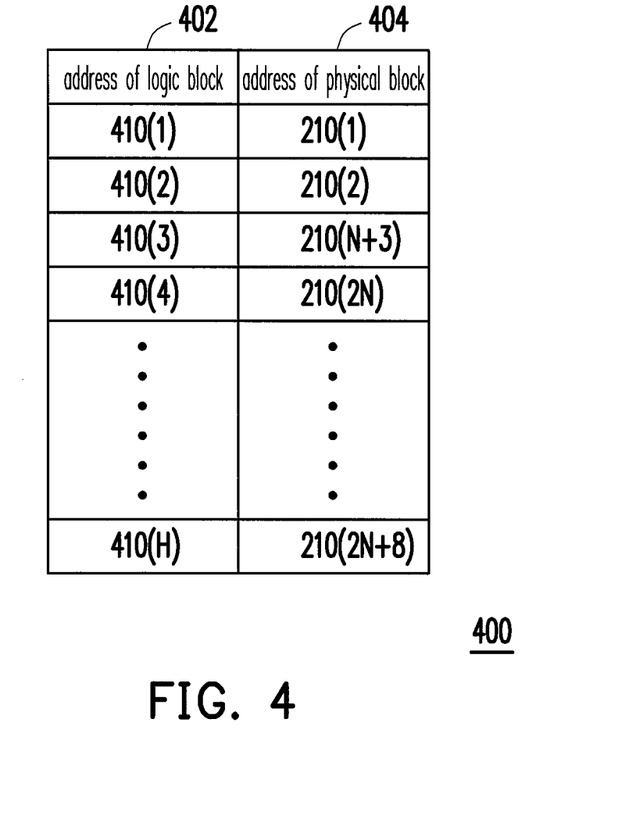
FIG. 4 is a schematic diagram of a BMT according to an exemplary embodiment of the disclosure.

FIG. 4 is a schematic diagram of a BMT according to an exemplary embodiment of the disclosure.

Referring to FIG. 4, the BMT 400 has a logical block address field 402 and a physical block address field 404.

The logical block address field 402 is used for recording the addresses of all logical blocks disposed in the memory storage system 100. For example, in the exemplary embodiment, the logical blocks 410(1)-410(H) are configured for the operation system or the application programs to access data.

The physical block address field 404 is for recording the physical block presently mapped by each logical block. In more details, the physical block 210(1)-210(3N) are for writing in the data belonging to the logical blocks 410(1)-410(H) in the alternate way. When a physical block is used to write data belonging to a logical block into, the mapping table maintaining unit 124 of the central control device 120 would record the address of the physical block in the physical block address field corresponding to the logical block. In this way, the data processing unit 126 of the central control device 120 is able to access the data belonging to the logical block according to the BMT 400. For example, when the logical block 410(1) presently maps to the physical block 210(1) and the central control device 120 is going to access the data in the logical block 410(1), the data processing unit 126 would recognize the physical block 210(1) mapped by the logical block 410(1) according to the BMT 400 and issue an command to the first flash memory storage device 160a to access data from the physical block 210(1). That is to say, although the mapping relationship between logical blocks and physical blocks is varied from time to time, however in the exemplary embodiment, the mapping table maintaining unit 124 is used for maintaining the BMT 400 and thereby, it is ensured to keep the mapping relationship correct along with the operation of the memory storage system 100.

Referring to FIG. 3 again, in step S303, the central control device 120 would use the communication commands according to the BMT for accessing data in the physical blocks of the flash memory storage devices (the first flash memory storage device 160a, the second flash memory storage device 160b and the third flash memory storage device 160c).

In more details, for accessing data, the data processing unit 126 of the central control device 120 would issue communication commands to the first flash memory storage device 160a, the second flash memory storage device 160b and the third flash memory storage device 160c according to the BMT maintained by the mapping table maintaining unit 124, in which the communication commands are transmitted to the controllers of the first flash memory storage device 160a, the second flash memory storage device 160b and the third flash memory storage device 160c through the first transmission interface 140a, the second transmission interface 140b and the third transmission interface 140c, and then, the controllers of the first flash memory storage device 160a, the second flash memory storage device 160b and the third flash memory storage device 160c would access the corresponding physical blocks according to the communication commands. The controllers of the first flash memory storage device 160a, the second flash memory storage device 160b and the third flash memory storage device 160c are able to recognize the communication commands, and then write data to or read data from the physical blocks according to the communication commands.

It should be noted that in addition to writing command and reading command supported by the general data transmission interfaces, other specific communication commands are also used in the memory storage system 100 by design, such as an erase command, a valid-page copy command, a bad-block inquiry command and a spare-area writing command. By using the communication commands, the central control device 120 is able to more effectively manage the first flash memory storage device 160a, the second flash memory storage device 160b and the third flash memory storage device 160c. The specific communication commands are respectively described in following.

In the exemplary embodiment, the above-mentioned erase command is for instructing the controllers of the flash memory storage devices to execute erasing operation on the physical blocks. The erase command has an erase starting address field and an erase number field, in which the erase starting address field records a starting physical address of the physical blocks to be erased therein, while the erase number field records the number of the physical blocks to be erased. When receiving an erase command, the controller of the flash memory storage device would erase at least one physical block according to the data of the fields in the erase command.

For example, when the data processing unit 126 records the physical address of the physical block 210(1) in the erase starting address field of an erase command, fills 2 into the erase number field of an erase command and transmits the erase command to the controller 162a of the flash memory storage device 160a, the controller 162a would erase the data in the physical block 210(1) and the physical block 210(2) according to the above-mentioned erase command. In other words, the data processing unit 126 of the central control device 120 can issue the erase command to the controller of the flash memory storage device to erase one or multiple physical blocks.

In the exemplary embodiment, the above-mentioned valid-page copy command is for migrating data between physical blocks. The valid-page copy command has a source address field, a target address field, a length field and a bitmap field. The source address field records a source physical address of the data to be migrated, the target address field records a target physical address of the data to be written into, the length field records a length of the data to be migrated wherein one page serves as a length unit, and bitmap field records an index of the data to be migrated. For example, the bitmap field records a plurality of bits and each bit is corresponding to one physical page and contains an indication of copying the physical page or not, in which a data value "1" means the physical page needs to be copied.

For example, It is assumed that the data processing unit 126 of the central control device 120 issues an valid-page copy command to the first flash memory storage device 160a, the source address field in the valid-page copy command herein records the address of the 0-th physical page of the physical block 210(1), the target address field records the address of the 0-th physical page of the physical block 210(2), and the length field records 4 and the bitmap field records "1001". When the first flash memory storage device 160a receives this valid-page copy command, the controller 162a would sequentially copy the data in the 0-th physical page and, then, the 3-th physical page among the four physical pages to the 0-th physical page and the 3-th physical page of the physical block 210(2). In other words, by using the valid-page copy command, the central control device 120 is able to instruct the flash memory storage device to copy data of a part of physical pages.

In the exemplary embodiment, the above-mentioned bad-block inquiry command is for confirming the state of a physical block. In more details, when a writing command on a physical block is issued, there might be I/O (input/output) error and the error may be caused by damage of the physical block. At the time, the central control device 120 may inquire the state of the physical block through the bad-block inquiry command.

For example, when the central control device 120 executes a writing operation on the physical block 210(1) with an I/O error, the data processing unit 126 may issue a bad-block inquiry command to the controller 162a of the flash memory storage device 160a. If the physical block 210(1) is damaged, the controller 162a would transmit the information about the bad physical block 210(1) to the central control device 120 in response to the bad-block inquiry command.

In the exemplary embodiment, the above-mentioned spare-area writing command is for transmitting the general data and the metadata together to the flash memory storage device. In more details, when executing a writing operation on a flash memory storage device, the data processing unit 126 of the central control device 120 needs to write the general data into the data-area of a physical page and the metadata corresponding to the general data into the spare-area of the physical page. By using the spare-area writing command, both the general data and the metadata can be transmitted to the flash memory storage device without separately transmitting the data so as to advance the writing efficiency.

It should be noted that in the exemplary embodiment, the central control device 120 transmits the communication commands to the first flash memory storage device 160a, the second flash memory storage device 160b and the third flash memory storage device 160c in a batch-cycling way. In more details, the central control device 120 divides a plurality of communication commands into multiple batches and each batch includes multiple communication commands so as to be respectively transmitted to the first flash memory storage device 160a, the second flash memory storage device 160b and the third flash memory storage device 160c. In particular, because the performance of executing multi commands for each of the flash memory storage devices can be improved by using a native command queuing (NCQ), it can increase the speed of processing commands by transmitting successive multiple communication commands to each of the flash memory storage devices with the batch-cycling way.

For example, when 30 communication commands are required to be sent to the first flash memory storage device 160a, the second flash memory storage device 160b and the third flash memory storage device 160c, the central control device 120 would divide the communication commands into three batches depending on the characteristics thereof, in which each batch contains 10 commands. After that, the central control device transmits the first batch of the communication commands to the first flash memory storage device 160a, the second batch of the communication commands to the second flash memory storage device 160b and finally the third batch of the communication commands to the third flash memory storage device 160c. It should be noted that since each batch contains multiple commands, the above-mentioned scheme, in comparison with separately sending each command in 30 times, can save much time. In addition, it should be noted that the number of the communication commands for each batch can be different from each other and it can be conducted in cycle way. For example, in another embodiment, 30 communication commands are divided into six batches respectively containing 6, 5, 4, 7, 5 and 3 commands. Then, the central control device 120 sequentially sends the previous three batches to the first flash memory storage device 160a, the second flash memory storage device 160b and the third flash memory storage device 160c. Finally, the central control device 120 further sequentially sends the next three batches to the first flash memory storage device 160a, the second flash memory storage device 160b and the third flash memory storage device 160c. In fact, the disclosure does not limit the number of the batches and the cycle way to the above-mentioned example.

Based on the depiction above, the central control device 120 of the memory storage system 100 in the exemplary embodiment can further advance the access efficiency by controlling the controllers of the flash memory storage devices through the above-mentioned communication commands.

In the block management mechanism of the exemplary embodiment, the physical blocks are dynamically clustered according to the number of access times.

Figure 5:
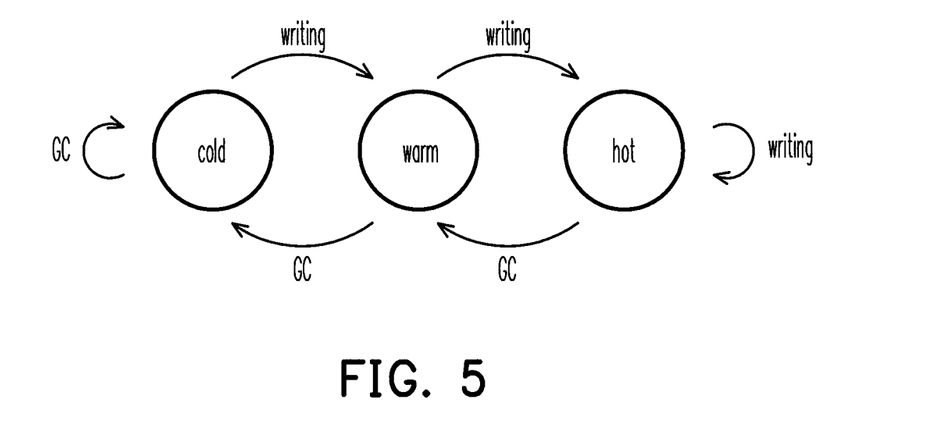
FIG. 5 is a schematic diagram of temperature levels of physical block according to an exemplary embodiment of the disclosure.

FIG. 5 is a schematic diagram of temperature levels of physical block according to an exemplary embodiment of the disclosure.

Referring to FIG. 5, when writing data to a logical address at the first time, its physical block would be set as cold 602. With increasing of the number of writing data to the same logical address, the physical block mapped to the logical address would be changed to warm 604. Since most of programs has characteristic of locality of reference, i.e., a program likely accesses a same physical block within a certain time, so that the change from cold 602 to warm 604 should be interpreted as many writing times to write data into the physical block and also represent the physical block has a quite chance to be written soon. Along with steadily increasing of the number of writing data to the same physical block, the physical block finally would be changed to hot 606, which means the physical block is being written into very frequently. On the other hand, when a garbage collection operation (GC operation) is performed on the physical block, the valid page in each physical block would reduce its temperature level by one class (for example, reduced from hot to warm). The GC operation is well known by people skilled in the art, which is omitted to describe.

In addition to the above-mentioned schemes that the communication commands are used for managing and controlling the first flash memory storage device 160a, the second flash memory storage device 160b and the third flash memory storage device 160c in the centralized manner and dynamically clustering the physical blocks according to the number of access times of the logical addresses mapped to the physical blocks, the central control device 120 in the exemplary embodiment further uses a hierarchical recording mechanism to record the utilization state of the physical blocks for more effectively recording the utilization and data states of the physical block. In following, some diagrams are used to explain the hierarchical recording mechanism.

As the depiction above, the BMT records a mapping relationship between logical blocks and physical blocks, and the BMT is temporally stored in the cache 128 during the operation of the memory storage system 100 for faster updating. In particular, when the memory storage system 100 gets abnormal shutdown, the central control device 120 would store the BMT into the physical blocks of the flash memory storage devices; when rebooting, the central control device 120 would load the BMT from the physical blocks to the cache 128 so as to keep the operation go on.

Figure 6:
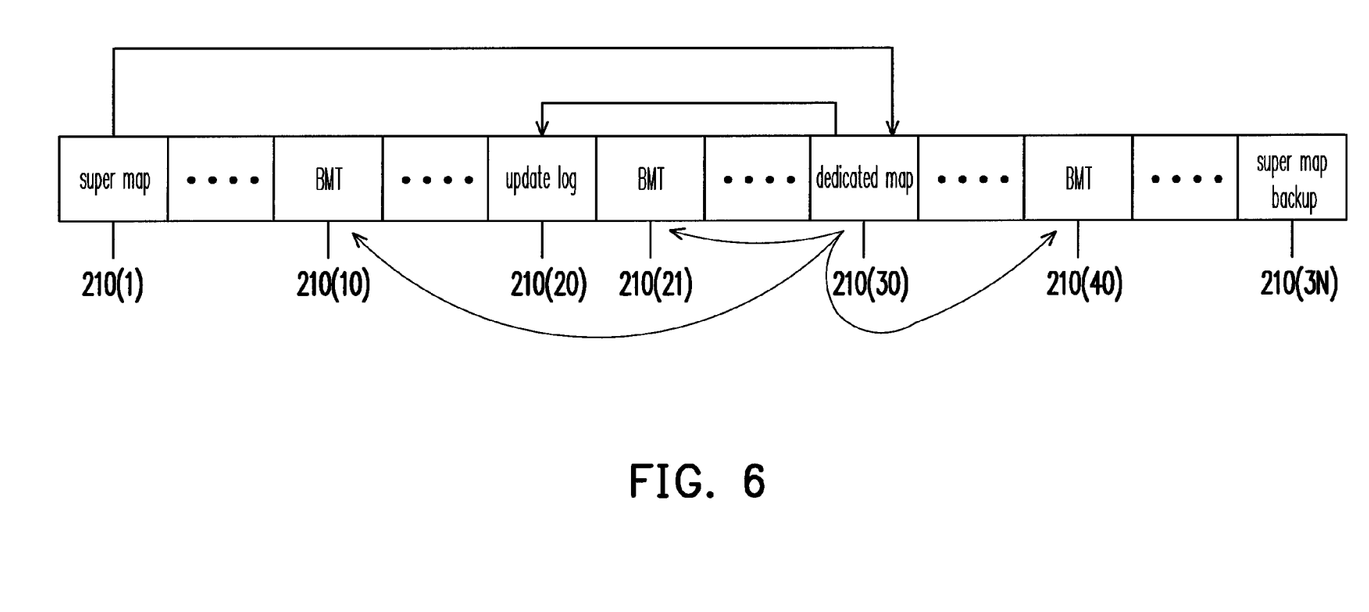
FIG. 6 is a schematic diagram showing a hierarchical recording mechanism used to record the utilization of physical blocks according to an exemplary embodiment of the disclosure.

FIG. 6 is a schematic diagram showing a hierarchical recording mechanism used to record the utilization of physical blocks according to an exemplary embodiment of the disclosure.

Referring to FIG. 6, in the exemplary embodiment, the mapping table maintaining unit 124 would store the super map, the dedicated map, an update log and the BMT in physical blocks of flash memory storage devices.

The super map is stored in a fixed physical block, for example, in the physical block 210(1). The super map records a booting index and a dedicated map index. The booting index records whether or not the memory storage system 100 gets abnormal shutdown, while dedicated map index records the address of a physical block for storing the dedicated map. In addition, the backup of the super map is stored in another fixed physical block (for example, the physical block 210(3N)), so that when the super map is damaged, the backup is used to recover the content of the super map. It should be noted that when the content of the booting index or the address of the physical block for storing the dedicated map is changed, the mapping table maintaining unit 124 would add a new record in the physical block 210(1) with a physical page as a unit so as to record the new booting index and the new dedicated map index. When the storage space of the physical block 210(1) reaches its limit, an erasing operation is performed on the physical block 210(1) so that the erased physical block 210(1) is continuously used for recording the new booting index and the new dedicated map index.

The dedicated map is stored in another physical block (for example, the physical block 210(30)). The dedicated map records a BMT index and an update log index. The BMT index indicates the address of a physical block for storing the BMT. The update log index indicates the address of a physical block for storing the update log. When the address of the physical block for storing the BMT or the address of the physical block for storing the update log is changed, the mapping table maintaining unit 124 would add a new record in the physical block 210(30) with a physical page as a unit so as to store the new BMT index and the new update log index. In particular, when the storage space of the physical block 210(30) reaches its limit, the mapping table maintaining unit 124 uses another physical block to record the new BMT index.

The BMT is stored in multiple physical blocks. The function of the BMT is described as above in association with the diagrams, which is no longer repeated.

The update log is stored in one of the physical blocks (for example, the physical block 210(30)) and registers the information related to the writing operation, the erasing operation and the GC operation performed by the data processing unit 126.

Figure 7:
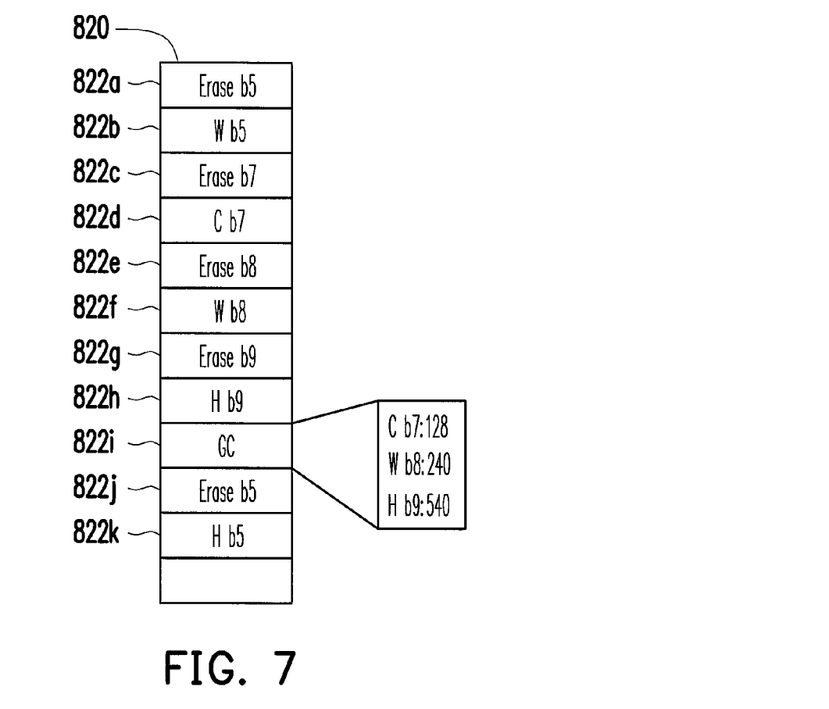
FIG. 7 is a schematic diagram of an update log according to an exemplary embodiment of the disclosure.

FIG. 7 is a schematic diagram of an update log according to an exemplary embodiment of the disclosure.

Referring to FIG. 7, the mapping table maintaining unit 124 registers one label on one physical page as a unit in the update log 820, in which the label indicates the operation for the data processing unit 126 to access physical blocks. The mapping table maintaining unit 124 would register erasing label, writing label and GC label in the update log 820.

In more details, when the data processing unit 126 performs a writing operation on a physical block of the flash memory storage devices, the mapping table maintaining unit 124 would register a writing label in the update log 820, in which the writing label records the address of the physical block and the temperature level of physical block.

For example, a label 822b of the update log 820 is a writing label corresponding to a physical block, in which the address of the physical block is 'b5' and the temperature level is "warm". The label 822b herein represents the data processing unit 126 wrote a data into a physical block 'b5' and the temperature level of the physical block was "warm" at that time.

When the data processing unit 126 performs an erasing operation on a physical block, the mapping table maintaining unit 124 would register an erasing label in the update log 820, in which the erasing label records the address of the physical block.

For example, a label 822e of the update log 820 is an erasing label corresponding to a physical block, in which the address of the physical block is 'b8'.

When the data processing unit 126 performs a GC operation on a physical block, the mapping table maintaining unit 124 would register a GC label in the update log 820, in which the GC label records the address of an active physical blocks in each temperature level and the number of the physical pages stored with data. The so-called active physical blocks mean those physical blocks which can be accessed simultaneously and each of the physical blocks are clustered into a corresponding temperature level based on the frequency of writing data.

Figure 8:
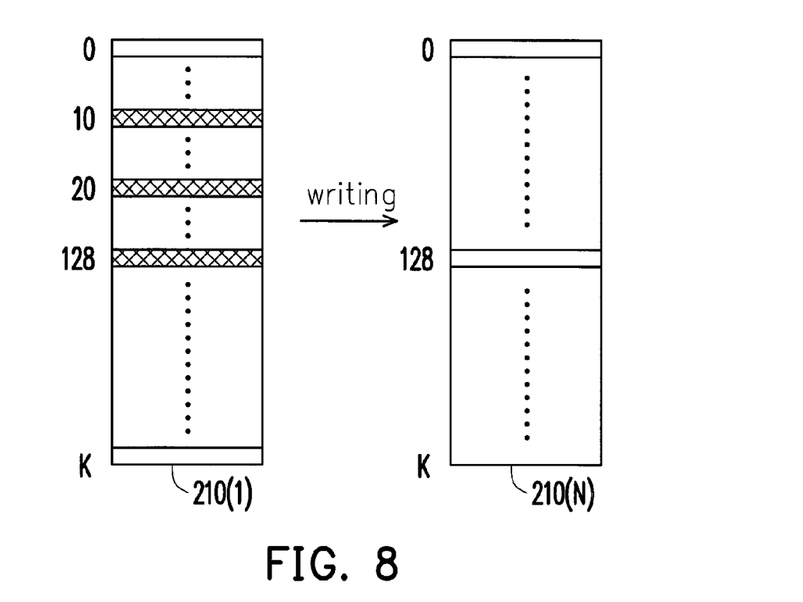
FIG. 8 is a schematic diagram of an active physical block according to an exemplary embodiment of the disclosure.

FIG. 8 is a schematic diagram of an active physical block according to an exemplary embodiment of the disclosure.

Referring to FIG. 8, to update the data stored on the $10^{th}$, $20^{th}$ and $128^{th}$ logical pages of a logical block, which currently mapped to the physical block 210(1)), the data processing unit 126 would write the data of the $10^{th}$, $20^{th}$ and $128^{th}$ logical pages into a blank physical block (for example, a physical block 210(N)), and meanwhile the $10^{th}$, $20^{th}$ and $128^{th}$ physical pages of the physical block 210(1) are labelled as "invalid". In this case, the physical block 210(N) is referred to an active physical block.

When performing a GC operation, the data processing unit 126 would copy the valid data in the $129^{th}$~$K^{th}$ physical pages of the physical block 210(1) to the $129^{th}$~$K^{th}$ physical pages of the physical block 210(N), followed by erasing the garbage physical block 210(1). The GC label herein records the physical pages stored with data in the active physical block 210(N) before performing the GC operation Referring to FIG. 7 again, for example, the label 822i of the update log 820 is a GC label which records the GC operations corresponding to three active physical blocks, in which the address of one active physical block is 'b8', the temperature level thereof is "warm" and the number of the physical pages stored with data is 240; the address of another active physical block is 'b7', the temperature level thereof is "cold" and the number of the physical pages stored with data is 128; and the address of another active physical block is 'b9', the temperature level thereof is "hot" and the number of the physical pages stored with data is 540.

In particular, when the storage space of the physical block stored with the update log 820 exceeds a predetermined threshold it (for example, 90% of the storage space of a physical block) or when the central control device 120 receives a shutdown command, the mapping table maintaining unit 124 would write the latest BMT temporally stored in the cache 128 into a physical block of the flash memory storage device so as to replace the old BMT and select another blank physical block to record the next label registered in the update log 820.

When the memory storage system 100 normally receives a shutdown command, the mapping table maintaining unit 124 would store back the latest BMT into the physical block of the flash memory storage device. However, when an abnormal shutdown (or power-failure) occurs in the memory storage system 100, since the latest BMT has not been written to the flash memory storage device at the time, so that the BMT loaded by the mapping table maintaining unit 124 during rebooting the memory storage system 100 may not be the latest one. In the exemplary embodiment, the mapping table maintaining unit 124 therefore would make the loaded BMT recovered to the latest BMT according to the information in the update log. The power-failure recovery mechanism provided by the exemplary embodiment is explained in following.

Figure 9:
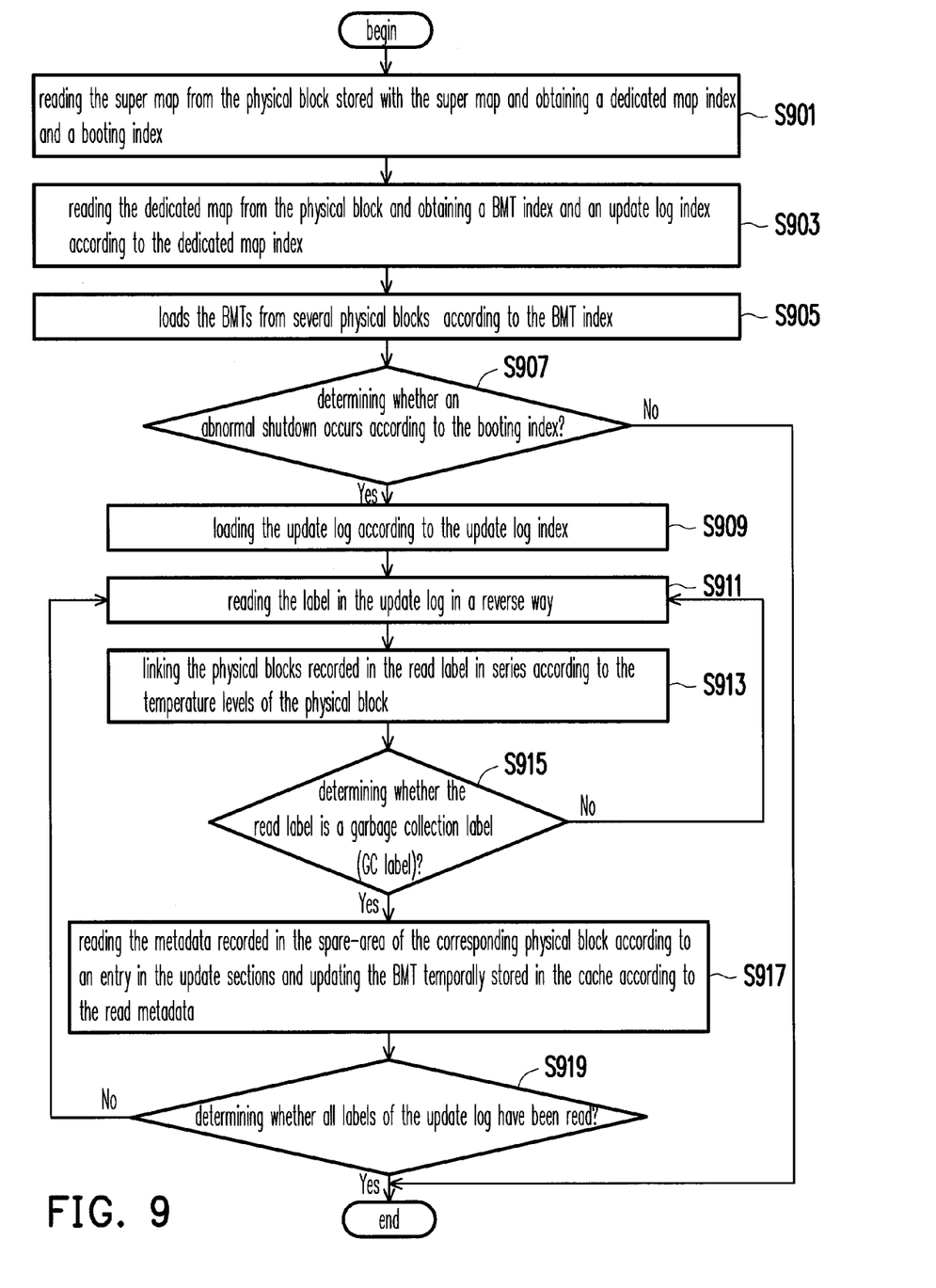
FIG. 9 is a flowchart of a power-failure recovery method according to an exemplary embodiment of the disclosure.

FIG. 9 is a flowchart of a power-failure recovery method according to an exemplary embodiment of the disclosure.

Referring to FIG. 9, first in step S901, the mapping table maintaining unit 124 reads the super map from the physical block stored with the super map (for example, the physical block 210(1)) and obtains the dedicated map index and the booting index.

Next in step S903, the mapping table maintaining unit 124 reads the dedicated map from the physical block (for example, the physical block 210(30)) and obtains the BMT index and the update log index according to the dedicated map index.

Then in step S905, the mapping table maintaining unit 124 loads the BMTs from several physical blocks (for example, the physical block 210(10), the physical block 210(21) and the physical block 210(40)) according to the BMT index.

In step S907, the mapping table maintaining unit 124 determines whether an abnormal shutdown occurs according to the booting index. If no abnormal shutdown occurs, it indicates the loaded BMT is the latest one and no need to update. At the time, the process of FIG. 9 is terminated.

If the abnormal shutdown occurs, in step S909, the mapping table maintaining unit 124 loads the update log according to the update log index. After that in step S911, the mapping table maintaining unit 124 reads the label in the update log in reverse way. In more details, referring to FIG. 7, the mapping table maintaining unit 124 reads the label 822h registered in the update log 820 and then, from the label 822h up towards the label 822a, reads other registered labels. In other words, the firstly read label is the one registered at the latest time.

In step S913, the mapping table maintaining unit 124 links the physical blocks recorded in the read label in series according to the temperature levels of the physical block. To be specific, if the read label is an erasing label, in the step S913, the mapping table maintaining unit 124 does nothing. If the read label is a writing label or a GC label, in step S913, the mapping table maintaining unit 124 links the physical blocks (the physical block addresses are listed in the label) in series according to different temperature levels. The physical blocks linked in series herein are distinguished into multiple update sections partitioned by the GC labels.

Then in step S915, the mapping table maintaining unit 124 determines whether the read label is a GC label. If the read label is not a GC label, step S911 is performed. If the read label is a GC label, in step S917, the mapping table maintaining unit 124 reads the metadata recorded in the spare-area of the corresponding physical block according to an entry in the update sections and updates the BMT temporally stored in the cache according to the read metadata.

Figure 10A:
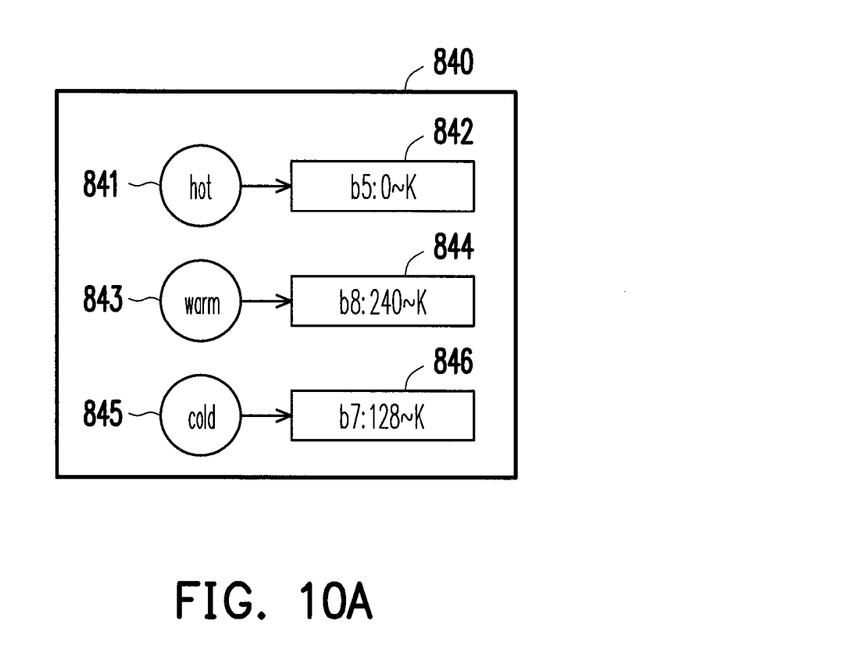
FIGS. 10A and 10B are schematic diagrams of linking physical blocks in series according to the update log show in FIG. 7.
Figure 10B:
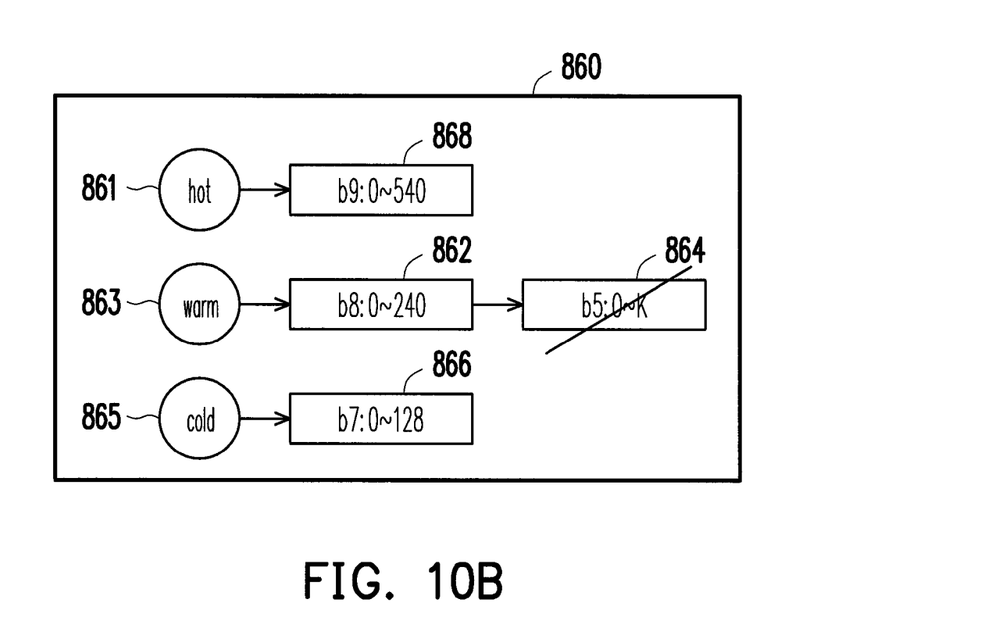

FIGS. 10A and 10B are schematic diagrams of linking physical blocks in series according to the update log shown in FIG. 7.

Referring to FIGS. 10A and 10B, each of the update sections includes a hot string, a warm string and a cold string. As described above, the write labels and the GC labels in the update log are read in reverse way to link to the hot string, the warm string and the cold string of each of the update sections.

The first update section 840 contains log information corresponding to the labels 822k~822i. For example, when reading the writing label 822k, because the temperature level of the physical block recorded in the writing label 822k is "hot", the mapping table maintaining unit 124 would add an entry 842 in the hot string 841 of the first update section 840, in which the entry 842 registers the address of the physical block ('b5') and all the physical pages thereof (i.e., the $0^{th}$~$K^{th}$ physical pages).

It should be noted that the physical pages registered by the entry 844 is the $240^{th}$~$K^{th}$ physical pages because the update sections are separated by the GC labels. As a result, only those physical pages after the $240^{th}$ physical page of the physical block corresponding to address 'b8' in the entry 844 of the first update section 840 need to be processed, while the physical pages prior to the $240^{th}$ physical page are accessed before performing the GC operation corresponding to the GC label 822i. Based on the same reason, the physical pages registered in the entry 846 is the $128^{th}$~$K^{th}$ physical pages. On the other hand, accordingly, the entry 842 registers the $0^{th}$~$K^{th}$ physical pages of the physical block corresponding to the address 'b5'.

In the exemplary embodiment, the mapping table maintaining unit 124 reads the metadata recorded in the spare-area of the corresponding physical blocks according to the addresses of the physical blocks registered in each of the entries of the first update section 840, in which the metadata records the address of the logical blocks mapped to the physical blocks. For example, it is assumed the address 'b5' of the physical block registered by the entry 842 is corresponding to the physical block 210(1), and the logical block mapped by the physical block 210(1) is recorded in the metadata in the spare-area of the physical page of the physical block 210(1), the mapping table maintaining unit 124 would update the mapping relationship of the physical blocks in the BMT temporally stored in the cache 128 after reading the logical block mapped by the physical block 210(1). In the exemplary embodiment, since the hot string 841 is the entry where the physical blocks (i.e., the blocks by frequently accessing) corresponding to the temperature level "hot" are stored, so that the mapping table maintaining unit 124 first reads the entries in the hot string 841 of the first update section 840, next reads the entries in the warm string 843 of the first update section 840 and finally reads the entries in the cold string 845 of the first update section 840. Accordingly, in the first update section 840, the mapping table maintaining unit 124 would sequentially read the metadata in the spare-areas of the physical blocks according to the sequence of the entry 842, the entry 844 and the entry 846, and then write updated mapping relationships into the BMT temporally stored in the cache 128.

Similarly, in the second update section 860, a writing label 822h would be added into the hot string 861 to serve as an entry 868; a writing label 822f would be added into the warm string 863 to serve as an entry 862; a writing label 822d would be added into the cold string 865 to serve as an entry 866; and a writing label 822b would be added into the warm string 863 to serve as an entry 864. Since the $0^{th}$~$K^{th}$ physical pages of the physical block corresponding to address 'b5' have been read in the first update section 840, so that in the second update section 860, the entry 864 would be removed by the mapping table maintaining unit 124. Comparing the entry 846 of the first update section 840 with the entry 866 of the second update section 860, since the mapping table maintaining unit 124 distinguishes the update sections by using the GC labels, differently from the entry 846, the entry 866 would register the $0^{th}$~$128^{th}$ the physical pages of the physical block corresponding to address 'b7'. In the same way, comparing the entry 844 of the first update section 840 with the entry 862 of the second update section 860, although both the two entries register the same address 'b8', but since the entry 844 of the first update section 840 has registered the $240^{th}$~$K^{th}$ physical pages of the physical block corresponding to the address 'b8', so that the mapping table maintaining unit 124 would register the $0^{th}$~$240^{th}$ physical pages of the physical block corresponding to address 'b8' in the entry 862 of the second update section 860. Similarly, the mapping table maintaining unit 124 would sequentially read the entry 862 and the entry 866 according to the sequence of the hot string 861, the warm string 863 and the cold string 865 in the second update section 860, and then sequentially update the mapping relationships of the physical blocks corresponding to the addresses 'b8' and 'b7' in the BMT temporally stored in the cache 128.

In step S919, the mapping table maintaining unit 124 determines whether all labels of the update log 820 have been read. If not all the labels are read, the workflow goes to step S911; otherwise, the process of FIG. 9 is terminated. At the time, the mapping table maintaining unit 124 recovers the BMT temporally stored in the cache 128 to the latest state according to the information in the update log 820.

In summary, the memory storage system, the central control device and the management method in the exemplary embodiments of the disclosure are capable of effectively improving the efficiency for controlling the flash memory storage devices through the communication commands with the batch-cycling writing way. In addition, the memory storage system, the central control device and the management method in the exemplary embodiments of the disclosure can effectively manage the mapping between logical addresses and physical addresses by using the super map, the dedicated map, the BMT and the update log designed in hierarchical way. Moreover, the memory storage system, the central control device and the power-failure recovery method in the exemplary embodiments of the disclosure can fast recover the BMT lost due to power-failure by using the information registered in the update log.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A power-failure recovery method, for a flash memory modules, wherein the flash memory modules has a plurality of physical blocks, each of the physical blocks has a plurality of physical pages and each of the physical pages has a data-area and a spare-area; the power-failure recovery method comprising:

reading a super map from the physical blocks;
reading a dedicated map according to the read super map;
loading a block map table (BMT) stored in the physical blocks to a cache;
determining whether an abnormal shutdown occurs; and
when the abnormal shutdown occurs, reading an update log according to the read dedicated map, sequentially distinguishing a plurality of labels of the update log into a plurality of update sections with a garbage collection label in the update log, and reading the label of each of the update sections from the update log in a reverse way and updating the BMT temporarily stored in the cache according to the read labels,
wherein the BMT records a mapping relationship between a plurality of logical blocks and the physical blocks, and
when executing a garbage collection operation, registering the garbage collection label in the update log, wherein the garbage collection label records an address of an active physical block and a number of the physical pages stored by data in each temperature level.

2. The power-failure recovery method as claimed in claim 1, further comprising:

using a fixed physical block among the physical blocks to store the super map;
using a physical block among the physical blocks to store the dedicated map;
using a plurality of physical blocks among the physical blocks to store the BMT;
using a physical block among the physical blocks to store the update log,
wherein the super map comprises a booting index and a dedicated map index and the dedicated map index records the address of the physical block storing the dedicated map,
wherein the dedicated map comprises a BMT index and an update log index, the BMT index records the addresses of the physical blocks storing the BMT, and the update log index records the address of the physical block storing the update log index.

3. The power-failure recovery method as claimed in claim 2, further comprising:

when receiving a shutdown command or the physical block storing the dedicated map is changed, adding a record in the super map with a unit of one physical page to record the latest booting index and the latest dedicated map index, and
when the physical blocks storing the BMT are changed or the physical block storing the update log is changed, adding a record in the dedicated map with a unit of one physical page to record the latest BMT index and the latest update log index.

4. The power-failure recovery method as claimed in claim 3, further comprising:

when executing a data writing operation on a first physical block among the physical block, registering a writing label corresponding to the first physical block in the update log, wherein the writing label records the address of the first physical block and the temperature level of the first physical block,
when executing an erasing operation on the first physical block, registering an erasing label corresponding to the first physical block in the update log, wherein the erasing label records the address of the first physical block and the temperature level of the first physical block.

5. The power-failure recovery method as claimed in claim 4, further comprising:

when a used space of the physical block storing the update log has reached a predetermined threshold or the shutdown command is received, writing the latest BMT temporarily stored in the cache into a plurality of blank physical blocks among the physical blocks of the flash memory storage devices.

6. The power-failure recovery method as claimed in claim 5, further comprising:

setting a temperature level of each of the physical blocks, wherein the temperature level is one of a plurality of levels.

7. The power-failure recovery method as claimed in claim 6, wherein the levels include a hot level, a warm level and a cold level.

8. The power-failure recovery method as claimed in claim 6, wherein the step of reading the label of each of the update sections from the update log in the reverse way and updating the BMT temporarily stored in the cache according to the read labels comprises:

when reading out the writing label from the update log in each of the update sections, linking a corresponding physical block in series according to different temperature levels by the mapping table maintaining unit; and
when reading out the garbage collection label from the update log in each of the update sections, reading metadata from the spare-area of the physical page of the corresponding physical block linked in series and updating the BMT temporarily stored in the cache according to the read metadata.

9. A central control device, used for managing a plurality of physical blocks of at least one flash memory module wherein each of the physical blocks has a plurality of physical pages and each of the physical pages has a data-area and a spare-area; the central control device comprising:

a central processing unit (CPU);
a cache, coupled to the CPU;
a data processing unit, coupled to the CPU and configured for accessing the physical blocks; and
a mapping table maintaining unit, coupled to the CPU,
wherein when rebooting, the mapping table maintaining unit reads a super map from the physical blocks, reads a dedicated map according to the read super map, loads a block map table (BMT) stored in the physical blocks to the cache according to the dedicated map and determines whether an abnormal shutdown occurs,
wherein when the abnormal shutdown occurs, the mapping table maintaining unit reads an update log according to the read dedicated map, sequentially distinguishes a plurality of labels of the update log into a plurality of update sections with a garbage collection label in the update log, reads the label of each of the update sections from the update log in a reverse way and updates the BMT temporarily stored in the cache according to the read labels,
wherein the BMT records a mapping relationship between a plurality of logical blocks and the physical blocks,
wherein when executing a garbage collection operation, the mapping table maintaining unit registers a garbage collection label in the update log, wherein the garbage collection label records an address of an active physical block and a number of the physical pages stored by data in each temperature level.

10. The central control device as claimed in claim 9,
wherein the central control device uses a fixed physical block among the physical blocks of the flash memory storage devices to store a super map,
wherein the central control device uses a physical block among the physical blocks of the flash memory storage devices to store a dedicated map,
wherein the central control device uses a plurality of physical blocks of the flash memory storage devices to store the BMT,
wherein the central control device uses a physical block among the physical blocks of the flash memory storage devices to store an update log,
wherein the update log registers a plurality of labels,
wherein the super map comprises a booting index and a dedicated map index and the dedicated map index records the address of the physical block storing the dedicated map,
wherein the dedicated map comprises a BMT index and an update log index, the BMT index records the addresses of the physical blocks storing the BMT, and the update log index records the address of the physical block storing the update log index.

11. The central control device as claimed in claim 10,
wherein when receiving a shutdown command or the physical block storing the dedicated map is changed, the mapping table maintaining unit adds a record in the super map with a unit of one physical page to record the latest booting index and the latest dedicated map index,
wherein when the physical blocks storing the BMT are changed or the physical block storing the update log is changed, the mapping table maintaining unit adds a record in the dedicated map with a unit of one physical page to record the latest BMT index and the latest update log index.

12. The central control device as claimed in claim 11,
wherein when executing a data writing operation on a first physical block among the physical block, the mapping table maintaining unit registers a writing label corresponding to the first physical block in the update log, wherein the writing label records the address of the first physical block and the temperature level of the first physical block,
wherein when executing an erasing operation on the first physical block, the mapping table maintaining unit registers an erasing label corresponding to the first physical block in the update log, wherein the erasing label records the address of the first physical block and the temperature level of the first physical block.

13. The central control device as claimed in claim 12,
wherein when a used space of the physical block storing the update log has reached a predetermined threshold or the shutdown command is received, the mapping table maintaining unit writes the latest BMT temporarily stored in the cache into a plurality of blank physical blocks among the physical blocks of the flash memory storage devices.

14. The central control device as claimed in claim 13,
wherein the mapping table maintaining unit sets a temperature level of each of the physical blocks, wherein the temperature level is one of a plurality of levels.

15. The central control device as claimed in claim 13,
wherein the levels include a hot level, a warm level and a cold level.

16. The central control device as claimed in claim 14,
wherein when reading out the writing label from the update log in each of the update sections, the mapping table maintaining unit links a corresponding physical block in series according to different temperature levels,
wherein when reading out the garbage collection label from the update log in each of the update sections, the mapping table maintaining unit reads metadata from the spare-area of the physical page of the corresponding physical block linked in series and updates the BMT temporarily stored in the cache according to the read metadata.

\* \* \* \* \*